US009784962B2

(12) United States Patent
Ingersoll et al.

(10) Patent No.: US 9,784,962 B2
(45) Date of Patent: Oct. 10, 2017

(54) COOLING SYSTEMS AND METHODS FOR CRYO SUPER-RESOLUTION FLUORESCENCE LIGHT MICROSCOPY AND OTHER APPLICATIONS

(71) Applicant: Brandeis University, Waltham, MA (US)

(72) Inventors: Charles G. Ingersoll, Winthrop, MA (US); David J. Derosier, Newton, MA (US); Gina Turrigiano, Weston, MA (US); Marc Nahmani, Arlington, MA (US)

(73) Assignee: Brandeis University, Waltham, MA (US)

( * ) Notice: Subject to any disclaimer, the term of this patent is extended or adjusted under 35 U.S.C. 154(b) by 0 days.

(21) Appl. No.: 14/428,271

(22) PCT Filed: Sep. 13, 2013

(86) PCT No.: PCT/US2013/059748
§ 371 (c)(1),
(2) Date: Mar. 13, 2015

(87) PCT Pub. No.: WO2014/043526
PCT Pub. Date: Mar. 20, 2014

(65) Prior Publication Data
US 2015/0248002 A1   Sep. 3, 2015

Related U.S. Application Data

(60) Provisional application No. 61/700,501, filed on Sep. 13, 2012.

(51) Int. Cl.
*G02B 21/28* (2006.01)
*G02B 21/26* (2006.01)
(Continued)

(52) U.S. Cl.
CPC .............. *G02B 21/28* (2013.01); *G02B 21/26* (2013.01); *G02B 21/32* (2013.01); *G02B 21/33* (2013.01)

(58) Field of Classification Search
CPC ........ G02B 21/28; G02B 21/32; G02B 21/33; G02B 21/34
(Continued)

(56) References Cited

U.S. PATENT DOCUMENTS 5,598,888 A * 2/1997 Sullivan ................... G01N 1/42
165/263
5,870,223 A * 2/1999 Tomimatsu .............. G02B 1/06
359/392

(Continued)

FOREIGN PATENT DOCUMENTS

JP       S46-3915      1/1971
JP       S62-125211    8/1987
(Continued)

OTHER PUBLICATIONS

DeRosier, "Cryo-Palming the Synapse", p. 20 of: The M.R. Bauer Foundation Colloquium Series, Annual Scientific Retreat and Distinguished Lecture Series, Aug. 2011.
(Continued)

*Primary Examiner* — Bumsuk Won
*Assistant Examiner* — Ephrem Mebrahtu
(74) *Attorney, Agent, or Firm* — Wilmer Cutler Pickering Hale and Dorr LLP

(57) ABSTRACT

New systems and methods are described for maintaining a desired steady state temperature differential between two objects that may otherwise undergo heat transfer to restore thermal steady state. In one application, a cooling microscope assembly and its use with conventional optical microscopes are described for achieving super-resolution imaging.

(Continued)

The assembly allows for the high resolution imaging of samples at cryogenic temperatures while maintaining the temperature of the objective lens above freezing by employing circulation systems and a coupling fluid between the sample and objective lens.

15 Claims, 11 Drawing Sheets

(51) Int. Cl.
  *G02B 21/32* (2006.01)
  *G02B 21/33* (2006.01)
(58) Field of Classification Search
  USPC .......... 359/368–398; 165/260, 261, 263, 264
  See application file for complete search history.

(56) References Cited

U.S. PATENT DOCUMENTS

| | | | | |
|---|---|---|---|---|
| 2002/0108957 A1* | 8/2002 | Studer | ............... | G01N 1/42 220/592.28 |
| 2004/0263961 A1* | 12/2004 | Hummel | ............... | G02B 21/33 359/391 |
| 2007/0268469 A1* | 11/2007 | Fu | ............... | G03B 27/42 355/53 |
| 2007/0291360 A1* | 12/2007 | Pirsch | ............... | G02B 21/02 359/509 |
| 2008/0106795 A1 | 5/2008 | Shi et al. | | |
| 2008/0192341 A1* | 8/2008 | Le Gros | ............... | G02B 21/33 359/395 |
| 2010/0027109 A1* | 2/2010 | Liebel | ............... | G02B 21/24 359/381 |
| 2010/0073766 A1* | 3/2010 | Angros | ............... | B01L 3/545 359/397 |
| 2010/0275912 A1* | 11/2010 | Lulla | ............... | B65D 83/54 128/203.12 |
| 2010/0315705 A1* | 12/2010 | Harada | ............... | G02B 21/33 359/368 |
| 2011/0149394 A1* | 6/2011 | Wadell | ............... | G02B 7/028 359/512 |
| 2015/0147778 A1* | 5/2015 | Pickard | ............... | G01N 1/42 435/40.5 |

FOREIGN PATENT DOCUMENTS

| | | |
|---|---|---|
| JP | H04-165320 A | 6/1992 |
| JP | H04-245211 A | 9/1992 |
| JP | 2010-026218 A | 2/2010 |
| JP | 2011-058969 A | 3/2011 |
| JP | 2011180375 A | 9/2011 |
| WO | WO-2006113916 A2 | 10/2006 |

OTHER PUBLICATIONS

DeRosier, "Super-resolution light microscopy and the structure of the synapse", Life Sciences at Brandeis University, 2 pages, Aug. 9, 2011.

International Search Report and Written Opinion mailed Feb. 27, 2014, in the International application No. PCT/US2013/059748, filed Sep. 13, 2013, 10 pages.

The Partial Supplementary European Search Report mailed on May 18, 2016, in European application No. 13837090.3, 8 pages.

Think Nano, Featured Products, Nanopositioning Stages, Nanopositioners and Piezo Stages, Nanopositioning Systems, Mad City Labs, 2 pages, Aug. 15, 2015.

van Driel et al., "Tools for Correlative Cryo-Fluorescence Microscopy and Cry-Electron Tomography Applied to Whole Mitochondria in Human Endothelial Cells," European Journal for Cell Biology, Chapter 4, vol. 88, Issue 11, pp. 105-132, Nov. 2009.

* cited by examiner

COOLING SYSTEMS AND METHODS FOR CRYO SUPER-RESOLUTION FLUORESCENCE LIGHT MICROSCOPY AND OTHER APPLICATIONS

RELATED APPLICATIONS

This application claims priority to and incorporates by reference the entire contents of U.S. Provisional Application No. 61/700,501, filed Sep. 13, 2012.

TECHNICAL FIELD

This technology relates generally to maintaining a temperature differential over small distances. More specifically, this technology relates to microscopy, in particular, this technology relates to cryogenic high resolution light microscopy.

BACKGROUND

Conventional light microscopy with its resolution of about 200 nm is inadequate to study the organization of biological molecules (e.g., proteins) whose dimensions are generally less than 10 nm. Super-resolution fluorescent microscopy methods allow one to localize the position of an isolated switchable fluorophore (fluorescent chemical compounds used to label samples of interest) by determining the center of distribution of the fluorescent photons, with an error that depends primarily on the conventional resolution divided by the square root of the number of photons collected for the fluorophore. Thus, if one collects 100 photons, one can localize an isolated fluorophore to about 20 nm. The more photons one collects, the smaller the error or the better the "resolution."

The process of super-resolution fluorescent microscopy consists of activating (i.e., turning on the fluorescence) a limited number of photo-switchable fluorescent tags, mapping their positions and then repeating the cycle until all fluorophores have been activated and their fluorescence measured. The accuracy of localization, which depends on the number of total photons collected, depends on the probability of bleaching (i.e., destroying) the fluorophore as a function of the number of excitations. The positions of the set of sample molecules are determined from all the images and are plotted on a pseudo image thereby generating the super-resolution images.

Besides the number of photons collected, motion of the fluorophores during the repeated cycle of activation and mapping limits resolution. To achieve the highest accuracy in localization (that is, the maximum resolution), the relative motion between sample molecules must be eliminated. Although theoretical resolutions of a couple of nanometers is theoretically possible, currently only about 20 nm resolution is the norm.

Using microscopy at cryogenic temperatures, e.g., below −135° Centigrade (C.) has several beneficial effects related to improving image resolution. At such temperatures, molecular motion is reduced relative to that at room temperature. Samples that are fast or high-pressure frozen preserve native structure if held below −135° C. (e.g., in amorphous ice). Furthermore, the rate of bleaching of fluorophores is greatly reduced. By decreasing temperature of observation from room temperature to −135° C., bleaching rate can be reduced by a factor of about 50, which would increase resolution by a factor of about 7.

Several different approaches have been taken for holding samples at cryo-temperatures while viewing them in a light microscope. Commercially available devices, such as those available from Instec Inc. (Boulder, Colo.) or Linkam Scientific Instruments (Guildford, Surrey, U.K.) fit on standard light microscopes, insulating the objective lens from the cold sample by a set of windows separated by air gaps. Such devices necessarily use objectives with a relatively low numerical aperture (NA) (a dimensionless number that characterizes the range of angles over which the system can accept or emit light), since the angle of transmitted light from the specimen to the objective is limited by total internal reflection at the window (i.e., coverslip) to air interface. The conventional resolution varies inversely with the NA, and the square root of the number of photons collected varies with the NA. Thus the super-resolution varies inversely with the square of the NA. When gaps of several millimeters are required as is the case for the commercial cold stages, the highest NA lenses have a NA of about 0.4, which causes a reduction in resolution by a factor of about 9 relative to an immersion lens having a NA of about 1.2. Immersion lenses are used in standard super-resolution microscopy at room temperature and therefore set the standard. Hence the gain of a factor of about 7 achieved with a cryo-temperature is completely offset by the use of a low NA objective. If the gap is reduced to under a millimeter, higher NA lenses can be used but the loss is still a factor of about 3 to 4 relative to an immersion objective.

Other devices have used air-coupled lenses that in some cases have shortened the working distance so that lenses of higher NA (e.g., 0.75) can be used. Such systems nonetheless still result in a loss of about 60% of the photons.

Another reported attempt to provide a sample holder at cryogenic temperatures permits the sample to be held at cold temperatures while viewing it with a high NA objective by immersing the objective lens in a cryo-fluid having the approximate refractive index of water. The device has two drawbacks: it cannot be used with a conventional light microscope; and the objective must be operated at the same extremely cold temperatures. This latter condition means that the distances and dimensions designed to provide the highest performance are altered by the contraction of the parts of objective in the cold. Since the high NA objectives have cemented doublets, the objectives can fail as the glue holding the doublets together fails during repeated cycles of contraction and expansion.

Thus, there is presently no super-resolution cryogenic microscope assembly which can be used with a conventional light microscope without compromising the imaging resolution or performance of the microscope.

Any attempts to maintain a sample at cryogenic temperatures while viewing it with a an objective maintained at operating temperatures that allow for standard to high performance must grapple with the larger problem of maintaining a temperature differential over a small working distance. Heat (i.e., energy transferred between a system and its surroundings other than by work or transfer of matter) flows spontaneously (e.g., via conduction, convection, and/or radiation) from a hotter system to a colder system. When two or more systems or objects, for example, a sample and a conventional light microscope, come into thermal contact, they exchange energy through the microscopic interactions of their constituent particles. When the systems are at different temperatures, the result is a spontaneous net flow of energy that continues until the systems are in thermal steady state (e.g., the temperatures are equal). The rate of heat transfer is inversely proportional to the distance between the systems (i.e., the smaller the distance, the faster the transfer). The maintenance of a steady state temperature differential between two or more systems, particularly within a relatively small working distance from each other like a microscopy sample and immersion liquid, remains a challenge.

SUMMARY

An assembly and methods are described for maintaining a temperature differential between two objects positioned at a distance capable of resulting in heat transfer between the objects.

A cooling microscope assembly and its use with conventional light microscopes is also described for achieving super-resolution imaging.

In one aspect, an assembly for maintaining a temperature differential between two objects positioned at a distance capable of resulting in heat transfer between the objects includes a first circulation system for an immersion fluid capable of maintaining a first object at or above a first temperature, a second circulation system for a cooling fluid capable of maintaining a second object at or below a second temperature that is below the first temperature such that a temperature differential is maintained between the two objects, and a coupling medium that couples the first circulation system with the second circulation system.

In one or more embodiments, the first temperature is above the freezing point of the immersion fluid.

In one or more embodiments, the second temperature is below the amorphous to crystalline transition temperature of ice.

In one or more embodiments, the immersion fluid flow rate is between about 1 mL/min and 10 mL/min.

In one or more embodiments, the coupling medium is ambient air.

In one or more embodiments, the distance between the two objects is between about 0.1 mm and 1 mm.

In one or more embodiments, the first object is an immersion objective lens and the second object is a sample of interest.

In another aspect, a method of maintaining a temperature differential between two objects positioned at a distance capable of resulting in heat transfer between the objects includes providing an assembly, which includes a first circulation system capable of maintaining a first object at or above a first temperature, a second circulation system capable of maintaining a second object at or below a second temperature that is below the first temperature, and a coupling medium that couples the first circulation system with the second circulation system; and circulating an immersion fluid in the first circulation system and circulating a cooling fluid in the second circulation system such that a temperature differential is maintained between the two objects.

In another aspect, a cooling assembly for a microscope includes a first circulation system for an objective lens, which includes a light transparent element and a collar, including an upper surface capable of sealing engagement with an objective lens and a lower surface capable of sealing engagement with the light transparent element, the upper surface of the collar and the light transparent element defining a region for housing immersion fluid, and one or more ports for immersion fluid transport in and out of the region; a second circulation system for a sample stage, which includes an insulated enclosure, including a cold block for sample placement, and one or more ports for transport of a cooling fluid in and out of the insulated enclosure; and coupling fluid for optically coupling the light transparent element with a sample.

In one or more embodiments, the cooling fluid comprises at least one of chilled nitrogen gas and liquid nitrogen.

In one or more embodiments, the immersion fluid is at least one of water and an alcohol water mixture.

In one or more embodiments, the immersion fluid flow rate is between about 1 mL/min and 10 mL/min.

In one or more embodiments, the thickness of the light transparent element is between about 0.15 mm and 0.19 mm.

In one or more embodiments, the distance between the light transparent element and the objective lens is between about 0.1 mm and 1 mm.

In one or more embodiments, the coupling fluid has a freezing temperature below −135° C.

In one or more embodiments, the coupling fluid is selected from a group consisting of 4-methyl-1-pentene, 1-pentene, 3-methyl-1-pentene, 2-methyl-1-pentene, 1-hexene, and 2-pentene.

In one or more embodiments, the cooling assembly includes an objective lens.

In one or more embodiments, the distance between the light transparent element and the objective lens is between about 0.1 mm and 1 mm.

In one or more embodiments, the collar also includes an upper annular ring sized to substantially surround the objective lens, the upper annular ring being optionally integral to the collar.

In one or more embodiments, the first circulation system also includes a clamp ring sized to substantially surround the objective lens and joining members that secure the upper annular ring to the clamp ring.

In one or more embodiments, the cooling assembly also includes a gasket between the upper surface of the collar and the objective lens and/or a gasket between the lower surface of the collar and the light transparent element.

In one or more embodiments, the cooling assembly also includes a lower annular ring located below the light transparent element, the lower annular ring being secured to the collar.

In one or more embodiments, at least the collar comprises a polysulfone plastic.

In another aspect, a high resolution microscope assembly includes an immersion objective lens maintained at a temperature above freezing of the immersion fluid, a sample stage maintained at a temperature below the amorphous to crystalline transition temperature of ice, and a coupling fluid that optically couples the immersion objective lens with the sample stage.

In one or more embodiments, the resolution of the microscope is be about 200 nanometers and 300 nanometers.

In one or more embodiments, the numerical aperture of the objective lens is between about 0.4 and 1.4.

In another aspect, a method of observing samples includes providing a microscope assembly, including an immersion objective lens maintained at a temperature above freezing temperature of the immersion fluid and a sample stage maintained at a temperature below the amorphous to crystalline transition temperature of ice; locating a sample on the sample stage; introducing a coupling fluid that optically couples the objective lens with the sample; and viewing the sample through the objective lens.

In one or more embodiments, the stage drift during viewing is less than 5 microns.

In one or more embodiments, the vibration amplitude during viewing is less than 20 nanometers.

In one or more embodiments, the temperature of the sample is maintained between about −135° C. and 155° C.

In another aspect, a cooling assembly for a microscope includes a first circulation system for an objective lens, that includes a light transparent element and a collar with an upper surface capable of sealing engagement with an objective lens and a lower surface capable of sealing engagement with the light transparent element, the upper surface of the collar and the light transparent element defining a region for housing immersion fluid, and one or more ports for immersion fluid transport in and out of the region; a second circulation system for a sample stage configured to receive a specimen cold carrier cartridge and comprising one or more ports for transport of a cooling fluid in and out of the cartridge; and coupling fluid for optically coupling the light transparent element with a sample.

In another aspect, a specimen cold carrier cartridge for storing, transporting, and/or viewing a sample with a microscope cooling assembly includes an insulated enclosure having a cold block for sample placement and one or more ports for transport of a cooling fluid in and out of the insulated enclosure, the cold block being configured to be loaded with a sample in order to store, transport, and/or view a sample with a microscope cooling assembly while maintaining the temperature of the sample.

In one or more embodiments, a specimen cold carrier cartridge comprises a copper foam.

These and other aspects and embodiments of the disclosure are illustrated and described below. Other systems, processes, and features will become apparent to one with skill in the art upon examination of the following drawings and detailed description. It is intended that all such additional systems, processes, and features be included within this description, be within the scope of the present invention, and be protected by the accompanying claims.

BRIEF DESCRIPTION OF THE DRAWINGS

The invention is described with reference to the following figures, which are presented for the purpose of illustration only and are not intended to be limiting.

DETAILED DESCRIPTION

Figure 1:
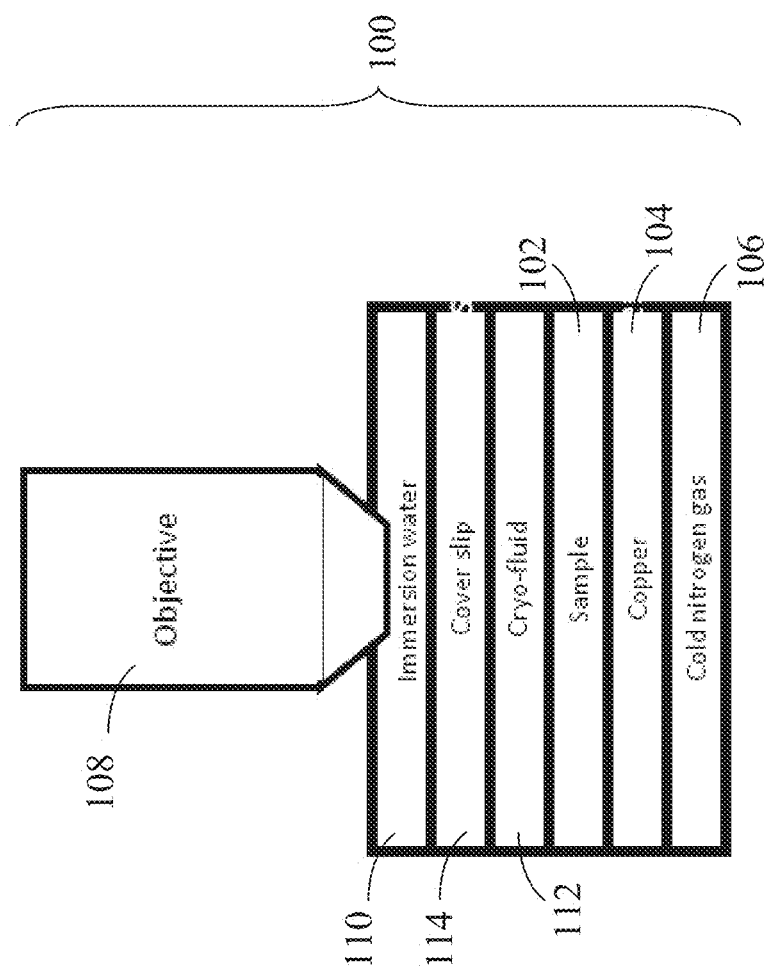
FIG. 1 is a schematic illustration of a cold stage and objective lens assembly for use with an optical microscope according to one or more embodiments.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The present disclosure introduces new systems, assemblies, and methods for maintaining a desired temperature differential between two systems or objects that may otherwise undergo heat transfer resulting in thermal steady state. In some embodiments, an assembly includes a first circulation system with an enclosure housing at least part of a first object and a reservoir with ports for circulating immersion fluid in and out of the reservoir. In some embodiments, the first circulation system maintains the first object at or above a desired temperature, such as the freezing point of the immersion fluid, despite contact and/or relatively close proximity with a second object at or below a much colder temperature, such as the amorphous to crystalline transition temperature of ice. In some embodiments, an assembly includes a second circulation system with an insulated enclosure housing at least part of a second object, a cold block, and a reservoir with ports for circulating cooling fluid in and out of the reservoir. In some embodiments, the second circulation system maintains the second object at or below a desired temperature, such as the amorphous to crystalline transition temperature of ice, despite contact and/or relatively close proximity with a first object at or above a much warmer temperature, such as the freezing point of the immersion fluid. In some embodiments, an assembly includes a coupling medium, which optically couples the first object and/or first circulation system with the second object and/or second circulation system such that the temperatures of the two objects are different despite contact and/or relatively close proximity.

Thus, the disclosed embodiments maintain a desired temperature differential between two systems or objects, particularly objects separated by only a short distance and hence more likely to undergo heat transfer.

According to further embodiments, a cooling microscope assembly and its use with conventional light microscopes is described for achieving super-resolution imaging. In some embodiments, resolution of the microscope can be increased from about 20 nm to about 2 nm, which achieves molecular resolution of protein molecules. In some embodiments, conventional microscopes with high resolution, high numerical aperture (NA) objective lenses can be used in this assembly. Thus, the disclosed cooling microscope assembly increases the achievable resolution over other devices that work with conventional light microscopes.

FIG. 1 is a schematic illustration of a cold stage and objective lens assembly 100 for use with an optical microscope according to one or more embodiments. The assembly employs a coupling fluid having a low thermal conductivity that is disposed between an immersion layer that is maintained at a relatively high temperature (e.g., room temperature) and a cryogenically cooled sample that is maintained at cryogenic temperatures. The transparent optical element (e.g., a coverslip) separates the two fluids. In at least one embodiment, a frozen sample 102 is disposed adjacent to a surface having high thermal conductivity, such as a copper surface 104. The high thermal conductivity surface can be cooled using one or more cryogenic fluids, such as liquid nitrogen or cold nitrogen gas 106, to temperatures below the amorphous to crystalline transition temperature of ice (about −135° C.). A range from about −140° C. to about −150° C. is optimal. The sample can be viewed with a liquid (e.g., water) immersion lens 108 operating in immersion fluid, such as immersion water 110 (e.g., above freezing). The immersion lens can be a conventional lens used in standard super-resolution microscopy at room temperature (in some embodiments with a NA of about 1.2). In typical embodiments of conventional light microscopy, the water-immersion objective lens has an NA that is greater than 0.3, or greater than 0.5, or greater than 0.8 or greater than 1.0, or greater than 1.1, or greater than 1.2, and ranging up to 1.4. A coupling fluid 112 (e.g., cryo-fluid) is used to couple the cold sample to the liquid-immersed objective lens via an optically transparent element, such as a coverslip 114. The device can thus be fit on a standard commercial light microscope. In this embodiment, almost all of the temperature drop of about 200° C. takes place over a distance of less than about 0.25 millimeters.

The immersion fluid of the lens is typically water but can be a simple alcohol or alcohol water mixture, which will lower the freezing temperature of the immersion fluid if necessary.

As used herein, the term "cryo-fluid" refers to a fluid that remains liquid at temperatures typical for the sample, does not boil at temperatures typical for the immersion fluid, and which maintains optical coupling between the coverslip and the sample; that is, the fluid has a refractive index near that of water (or immersion fluid). The cryo-fluid suitable for use in the microscope assembly is a liquid, that is, it is below its boiling point and above its freezing point, in the working ranges of the microscope assembly, e.g., about −135° C. to -150° C. In addition, the cryo-fluid has an index of refraction that is reasonably matched to water. The refractive index should be in the range of about 1.3 to 1.4. The mismatch from the refractive index of water will slightly widen the PSF (point spread function, approximately equal to the resolution of the conventional light microscope), leading to lower resolution of the lens. In addition, the cryo-fluid should have a low thermal conductivity, so that it helps to reduce the heat transfer from the immersion water to the sample. In one or more embodiments, the cryo-fluid has a thermal conductivity of less than 0.22 (W/M*° K) or less than 0.1 (W/M*° K). In other embodiments, the cryo-fluid has a thermal conductivity in the range of 0.3 (W/M*° K). Exemplary cryo-fluids include 4-methyl-1-pentene, 1-pentene, 3-methyl-1-pentene, 2-methyl-1-pentene, 1-hexene, and 2-pentene with conductivities in the range of about 0.1 to 0.3.

The equation below describes an exemplary steady state condition in which heat flows through the layers of the device (shown schematically in FIG. 1) and the temperatures are calculated at the interfaces between layers. The immersion fluid (e.g., water) layer is assumed to be held at 20° C. and the bottom of the copper block at −155° C. cooled by cold nitrogen gas. The temperature drop across the $i^{th}$ layer is given by $$\Delta T_i = \Delta T \frac{\Delta x_i / k_i}{\Sigma_j \Delta x_j / k_j} \quad (1)$$

where $\Delta T$ is the total temperature drop, $\Delta x_i$ is the thickness of the $i^{th}$ layer, and $k_i$ is the conductivity of the $i^{th}$ layer. As follows, Table 1 provides the expected temperature drops across each layer for typical layer thicknesses and conductivities, as calculated using equation (1):

TABLE 1

| Layer | Thickness (mm) | Conductivity (W/M * ° K) | Temperature drop (° C.) |
|---|---|---|---|
| Cover slip | 0.17 | 1 | −67 |
| Cryo-fluid | 0.050 | 0.2 | −99 |
| Sample | 0.015 | 1 | −6 |
| Copper | 3 | 460 | −3 |

Thus, this calculation predicts that the bottom of the sample is at −155+3=−152° C. and the top of the sample is −152+6=146° C., which is below the minimum temperature required to preserve the sample's structure. This calculation also predicts that the largest temperature gradient is established across the cryo-fluid. The ability to sustain this temperature gradient is a function of the low thermal conductivity of the cryo-fluid and the thickness of the sample.

Figure 2:
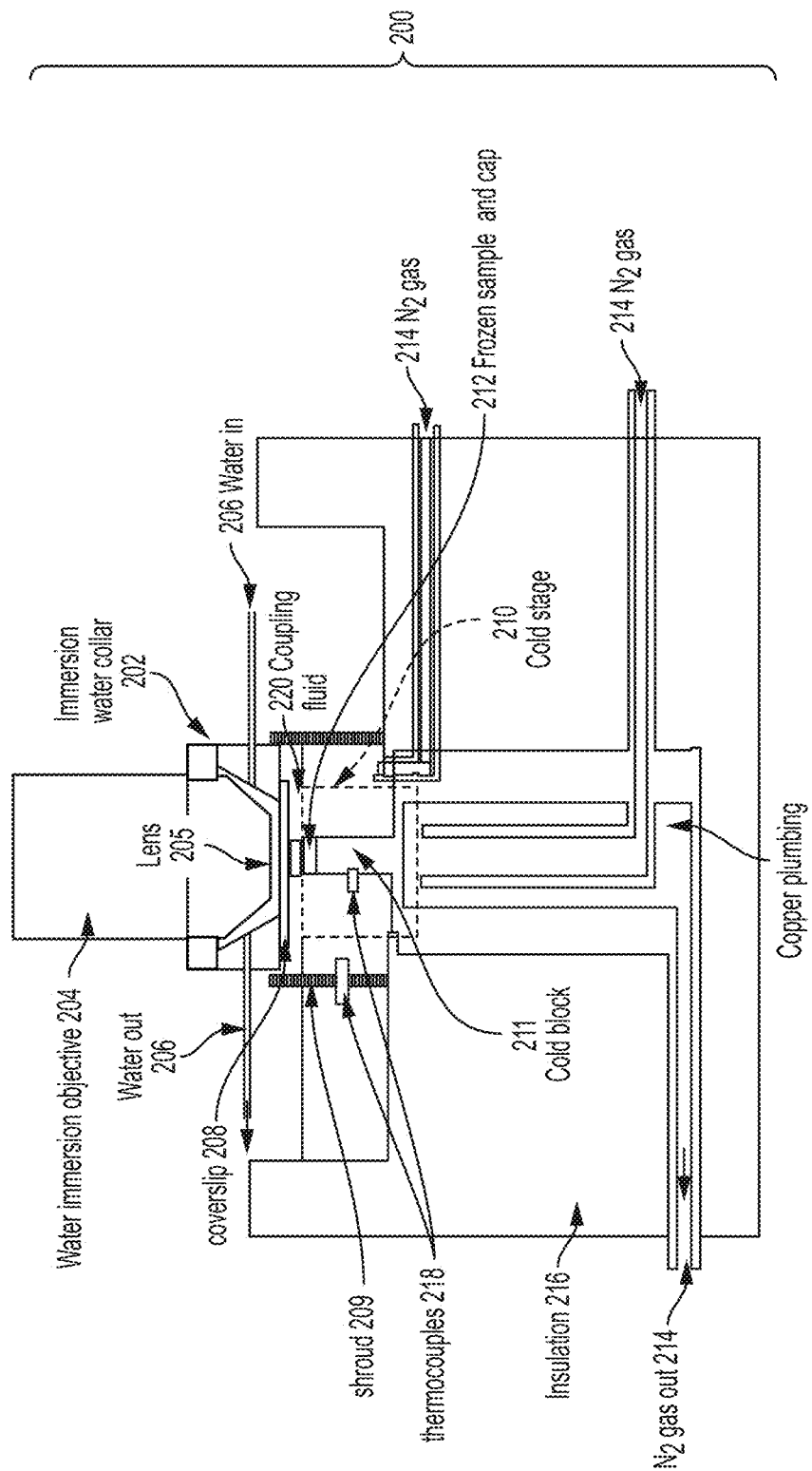
FIG. 2 is a detailed schematic illustration of a cooling assembly for use with an optical microscope according to one or more embodiments.

FIG. 2 is a detailed schematic illustration of at least one embodiment of a cooling assembly 200 for use with an optical microscope. FIG. 2 illustrates two components of the assembly.

According to some embodiments, the first component is a closed recirculation system or "collar" 202 that is attached to a conventional immersion microscope objective, such as a water-immersion objective 204. A water immersion objective is an objective lens used to increase the resolution of the microscope. This is achieved by immersing both the lens and the specimen in a liquid which has a higher refractive index than air, thereby increasing the NA of the objective lens. The collar 202, which may comprise a polysulfone plastic, defines a gap between the objective lens 205 and a transparent element, for example, a coverslip 208. Immersion fluid (e.g., water) 206 flows through the gap to optically couple the objective lens 205 to the top of the transparent element (e.g., a coverslip) 208. In some embodiments, the gap between the objective lens and the transparent element is about 0.05 mm, and can typically be between about 0.05 mm to about 0.1 mm. In some embodiments, a gap of up to 1 mm is possible. The immersion fluid 206 is circulated (e.g., with a pump and reservoir setup) between the objective 204 and the top of the transparent element 208 to maintain temperatures above freezing. A calculation based on heat flow and the heat capacity of water suggests that a flow rate of about 10 cc/min or 10 mL/min may be sufficient to prevent immersion water from freezing. In some embodiments, alcohol is added to the circulating immersion fluid 206 to lower its freezing point. In some embodiments, a simple resistance heater is placed in contact with the collar 202 to keep the objective 204 from becoming too cold. The bottom of the collar 202 can be extended below the level of the objective lens 205 to form an insulating "shroud" 209 around the sample 212 to shield it from ambient air (e.g., radiative heat transfer).

According to some embodiments, the second component of the assembly is a cold stage 210 which contains an elevated cold block 211 (e.g., a nitrogen gas cooled copper block) upon which sits a specimen, such as a frozen sample 212. In at least one embodiment, the bottom surface of the elevated cold block 211 is cooled with a cooling fluid, such as cold nitrogen gas 214, to keep the elevated cold block (e.g., a copper block) 211 at the correct temperature. The plumbing for the cooling fluid stream is shielded from the environment (e.g., ambient air) by surrounding insulation (e.g., a box) of low thermal conductivity (for example, a closed-cell foam, a vacuum Dewar, other high resistance enclosure) 216. To permit temperature control, the temperature may be recorded by a thermocouple 218 in the vicinity of the sample 212. In some embodiments, maintaining the sample temperature below −135° C. prevents the crystallization of amorphous ice in which the sample 212 is embedded. (At temperatures above −135° C., water in amorphous ice may crystallize and alter the structure of a sample). According to some embodiments, the sample 212 is optically coupled to the bottom of the transparent element (e.g., the coverslip) 208 by a coupling fluid (e.g., a cryo-fluid) 220. The coupling fluid 220 is placed on the sample 212 and the focus (e.g., height) of the microscope is adjusted, in some embodiments, until the transparent element 208 and the coupling fluid 220 are in contact and/or the sample is in focus during sample viewing. In a preferred embodiment, the microscope focus is adjusted until both contact and focus are satisfactory.

Figure 3:
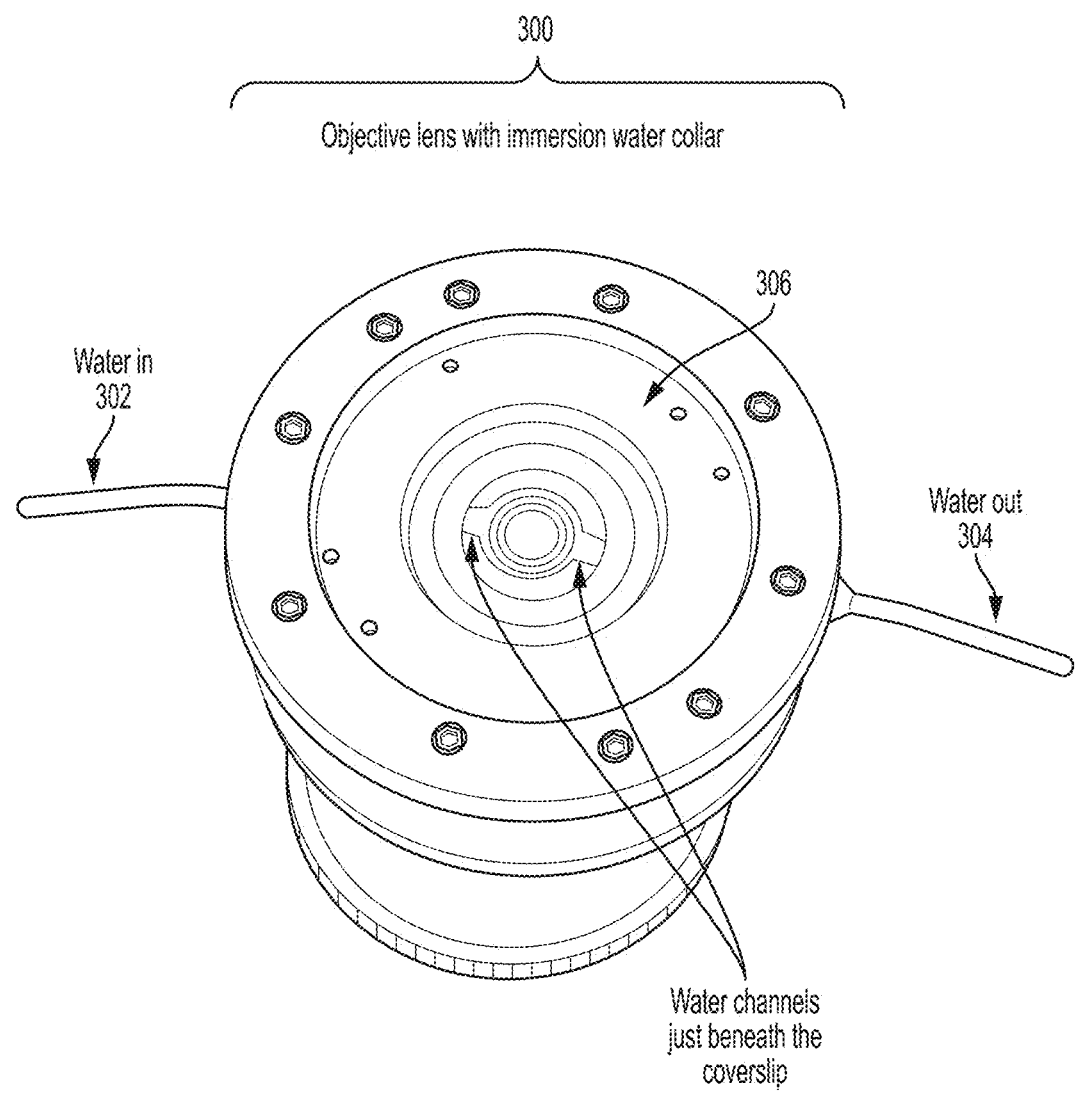
FIG. 3 is a photograph of a closed recirculation system ("collar") for an objective lens according to one or more embodiments.

FIG. 3 is a photograph of at least one embodiment of a closed recirculation system or collar 300 for an objective lens. A collar may have numerous shapes (and sizes according to some embodiments. In some embodiments, the inner diameter may be adjustable in order to fit varying sizes of objectives. In preferred embodiments, a collar is annular and can surround and be secured to an immersion objective in a conventional optical microscope. In the embodiment shown, the collar 300 is attached to an objective by a clamping ring, which does not require any modification to the objective; however, any manner of joining the a collar and an objective may be employed. In some embodiments, other methods of attachment are possible; for example, an objective lens could be modified so that a collar can be attached with screws into the body of the objective. In preferred embodiments, when in use, a collar and an objective move as a rigid unit relative to the sample (and stage) to achieve focus and to image the sample.

One or more gaskets (made from, e.g., thin pieces of rubber or other materials) can be used to make watertight seals between the objective and the transparent element (e.g., a coverslip). The gap between the objective and the transparent element may be between about 0.05 mm to about 0.1 mm, depending on the thickness of any gaskets. In some embodiments, this gap is increased to be up to about 1 mm. In some embodiments, a piece (e.g., a ring) of material 306, such as a water-resistant plastic or laminate (e.g., Garolite®, available from Omya UK Chemicals (Chaddesden, Derby, U.K.)), is attached to the bottom of the collar 300 to secure the transparent element and any gaskets to the objective (see the exemplary gaskets 406, 409 and securing material 410 in FIG. 4 for more detail according to at least one embodiment).

Input 302 and output 304 ports on the collar 300 supply and remove the circulating immersion fluid according to some embodiments. The immersion fluid is typically water; however, other liquids such as a water-alcohol mixture can be used. Alcohols such as ethanol, methanol or propanol may be used in some embodiments. The percent by volume of the water-alcohol mixture can vary from 0% to 100%. A pump and/or other methods/devices such as gravity feed can be used to push or draw the immersion fluid through the collar.

In some embodiments, the bottom of the collar (i.e., the portion furthest from the objective lens) can be extended to form a protective barrier or "shroud" around the sample to shield it from the environment (e.g., ambient air). The shroud portion of the collar can even surround the cold block to define a sample cavity. As shown in FIG. 2, cold (e.g., −155° C.), dry gas 214 can be fed into the a sample cavity when a collar 202 is placed above the sample 212.

Figure 4:
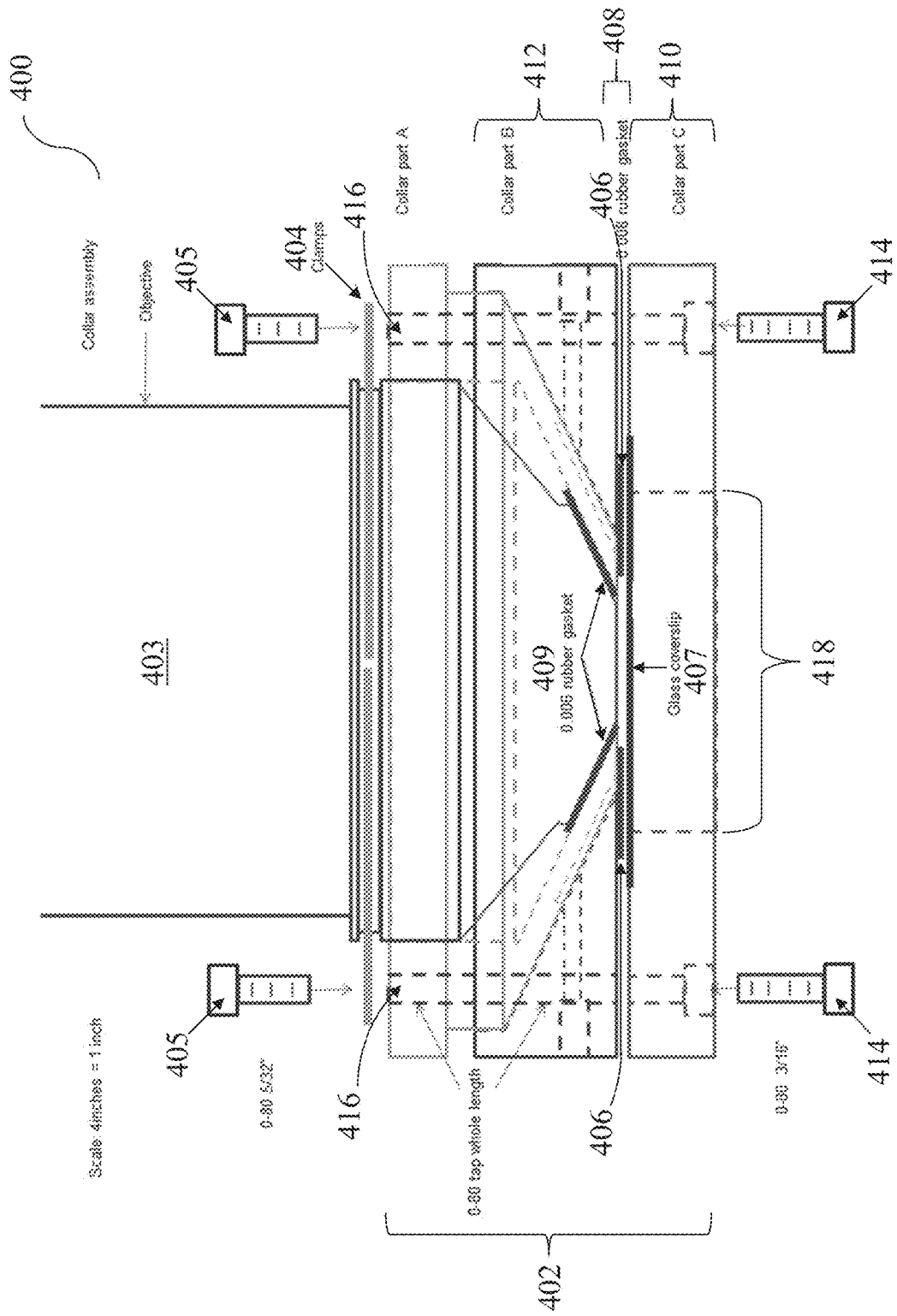
FIG. 4 is a schematic illustration of a closed recirculation system ("collar") and objective lens assembly according to one or more embodiments.

FIG. 4 is a schematic illustration of a closed recirculation system or collar and objective lens assembly 400 in one or more embodiments. In this example, the collar 402 is attached to the objective 403 by a clamping ring 404 using one or more fasteners, such as screws 405. In some embodiments, one or more screws 405 secure the collar onto the objective by passing through openings (not shown) in the clamping ring 404 and threading into one or more complementary holes 416 in the collar 402.

One or more gaskets (made from, e.g., rubber or other thin material) can be used to make watertight seals between, for example, the lower surface of the middle portion of the collar 412 and the transparent element 407 (e.g., a coverslip), that is, the lower gaskets 406, and/or between the inner surface of the middle portion of the collar 412 and the objective 403, that is, the upper gaskets 409. The gap 408 between the objective 403 and the transparent element 407 (e.g., a glass coverslip) is between about 0.05 mm to about 0.1 mm, depending on the thickness of the gaskets 406, 409. In some embodiments, this gap is increased to be up to about 1 mm. In the embodiment shown in FIG. 4, a ring of a water-resistant plastic or laminate (e.g., Garolite®) 410 is used to secure the coverslip 407 and lower gaskets 406 to the middle portion of the collar 412 via a second set of one or more fasteners, such as screws 414. The screws 414 secure the laminate 410 to the middle portion of the collar 412 through openings 416 running through the laminate 410 and/or the collar according to some embodiments. In some embodiments, the laminate 410 is designed to have a hollow annular region 418 in the middle. In certain embodiments, when the collar assembly 400 is aligned above the cooling stage (see, e.g., FIG. 2), a hollow region 418 in the laminate 410 allows for direct contact of the coupling fluid (i.e., coupling fluid 220 in contact with the sample 212 in FIG. 2) with the transparent element 407 (i.e., coverslip 208 in FIG. 2). In addition, the ring can be configured to surround the cold block and help isolate the cold stage from the ambient temperatures. Thus, the ring can serve as the previously mentioned shroud according to some embodiments.

Figure 5:
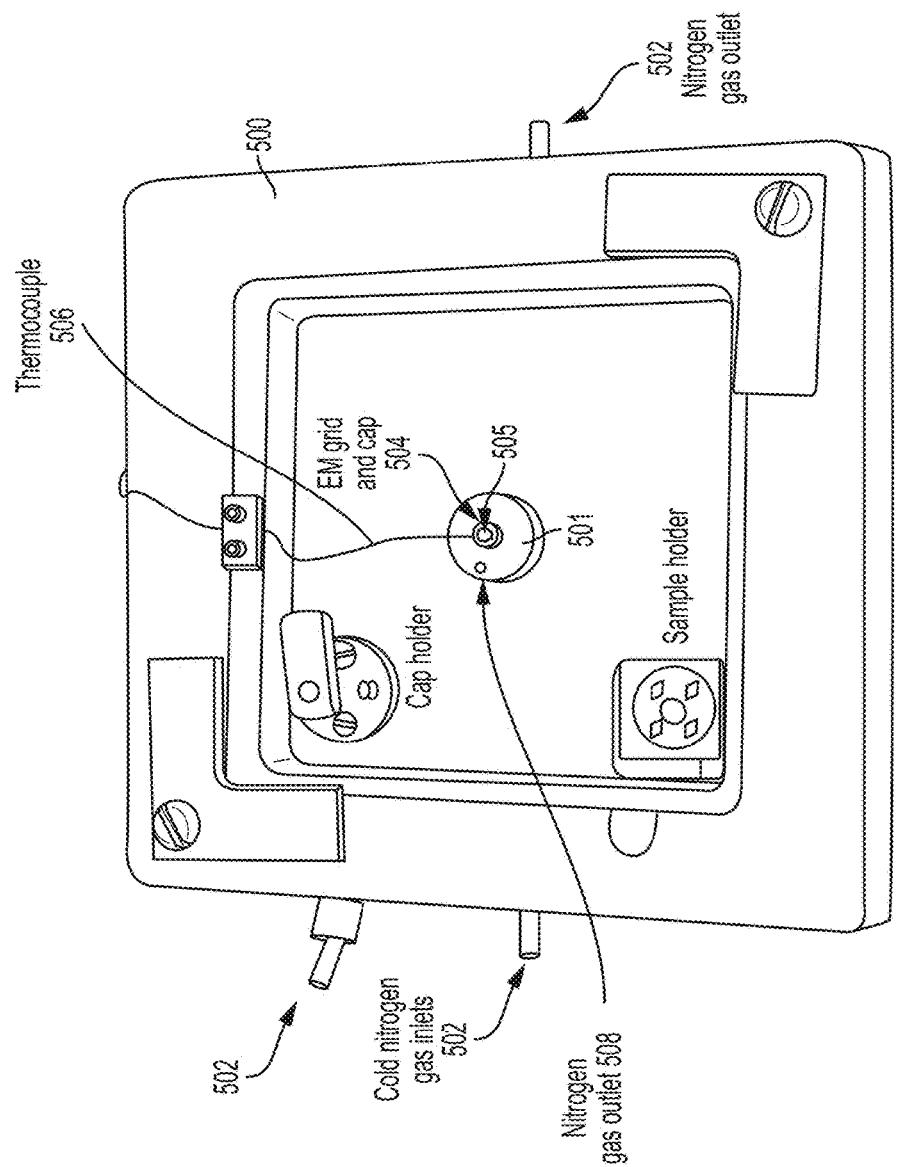
FIG. 5 is a photograph of a cold stage assembly according to one or more embodiments.

FIG. 5 is a photograph of a cold stage assembly according to one or more embodiments. The cold block is of high thermal conductivity (e.g., copper). In the embodiment pictured in FIG. 5, the cold stage 500 has a copper cold block or pedestal 501, configured so that a sample, such as sample 505, sits upon the pedestal. In some embodiments, a small cap 504 holds the sample 505 on the cold block 501. The end of the cap 504 can be thin (e.g., about 0.05 mm) and/or define a hole to permit light through to the sample 505.

The pedestal 501 is cooled from its underside by a cooling fluid 502. In addition, cooling fluid can serve to cool a sample, to cool a coverslip on a collar, and to prevent water vapor from contaminating a sample (i.e., prevent the condensation of ambient air water on the sample). Any fluid (e.g., nitrogen gas) that can circulate at temperatures below −135° C. can be used as a cooling fluid according to some embodiments. In further embodiments, the fluid circulates at a temperature of −155° C. The plumbing for the cooling fluid can be shielded from the ambient air by a surrounding enclosure (e.g., a box) of low thermal conductivity, such as a closed-cell foam, vacuum Dewar, or other low conductivity enclosure. Other standard existing, and/or future insulating materials can also be used. The source of the cooling fluid, such as cold nitrogen gas, can be coils of liquid nitrogen through which the fluid is passed. Cooling fluid can also be supplied directly from a large liquid gas container. Cooling fluid can be transported to and/or within a cold stage assembly according to some embodiments by tubing that is configured to withstand cold temperatures (e.g., silicon rubber tubing). The tubing can also be shielded by foam or other materials with low thermal conductivity. The flow rates of the cooling fluid can be adjusted to control the temperature of a cold block or pedestal and thereby a sample. In some embodiments, flow controllers may be used to control the flow rates of gases. Temperature can be recorded by, for example, a thermocouple 506, which is positioned in some embodiments beneath the specimen in order to aid temperature regulation. According to some embodiments, a second stream of cooling fluid is fed into the space surrounding the sample, for example, through an additional outlet 508.

According to some embodiments, a cold stage assembly has minimal drift (e.g., less than about 10 microns) during an experiment and/or minimal vibration (e.g., less than about 20 nm) during an exposure. In certain embodiments, nitrogen gas rather than liquid nitrogen is used as a cooling fluid to reduce the drift rate of a cold stage from several millimeters to just a few microns during an experiment of about 15 minutes. In some embodiments, engagement (e.g., rigid attachment) of a cold stage with fasteners (e.g., screws) to one or more parts of the microscope assembly can also reduce drift and/or vibrations. In some embodiments, drift and/or vibration can be reduced by allowing a cold stage to cool down from about 25° C. to about −140° C. over a period of about 30 minutes or more for temperature steady state.

According to some embodiments, a layer of coupling fluid (e.g., cryo-liquid) optically couples a light transparent element (e.g., coverslip) to a sample. This coupling can provide high resolution. In some embodiments, the coupling fluid is a liquid and can accommodate changes in the gap between the transparent element and the sample during the focusing of the objective. In some embodiments, the coupling fluid may consist of 4-methyl-1-pentene, 1-pentene, 3-methyl-1-pentene, 2-methyl-1-pentene, 1-hexene, and 2-pentene. In preferred embodiments, the coupling fluid has a freezing temperature below −135° C. and as high a boiling point as possible.

Figure 6:
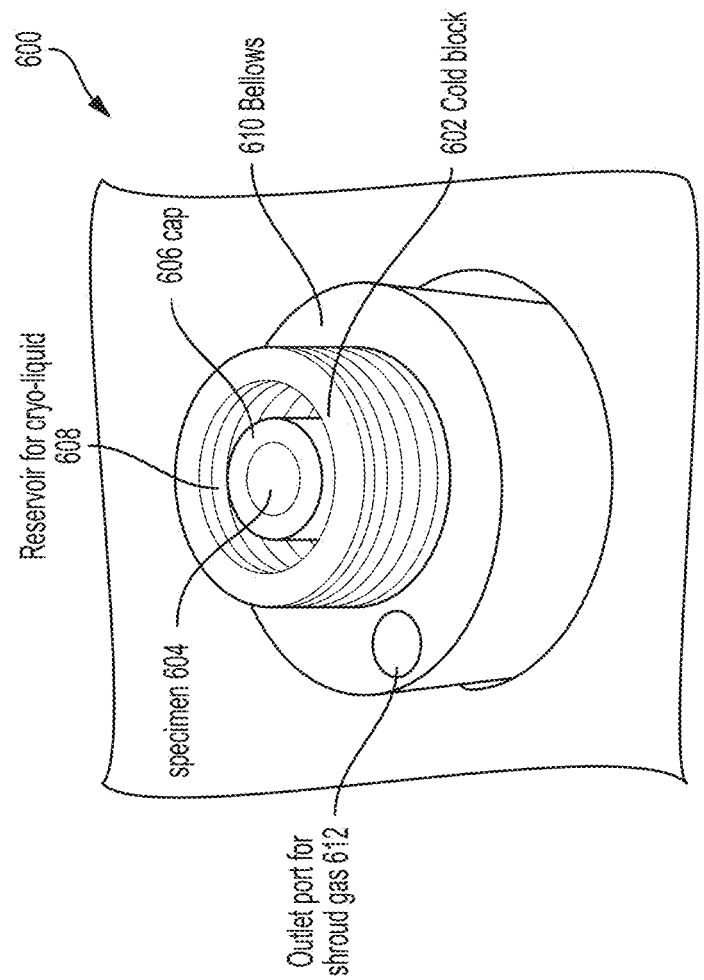
FIG. 6 is a photograph of a part of a cold stage assembly for use with an optical microscope according to one or more embodiments.

FIG. 6 is a photograph of a part of a cold stage assembly 600 according to some embodiments, such as that shown in FIG. 5. The photograph in FIG. 6 shows a cold block (e.g., a cylindrical copper block) 602, upon which a sample or specimen 604 is placed for viewing. The specimen 604 is held in place by a cap 606 according to some embodiments. The cap 604 may be a metal cylinder with a lip that keeps it from sliding down the cold block 602 holding the specimen 604. In further embodiments, the lip may be thin (e.g., about 0.05 mm thick). In some embodiments, the specimen 604 can be mounted on a metal disk (e.g., an electron microscopy grid) with a cap 604, which can cover the outside of the metal disc holding the specimen and can define a hole above the specimen. In some embodiments, this hole can be about 2.8 mm in diameter. In some embodiments, the specimen can be placed on a grid so that the specimen can be transferred without additional mounting and/or movement from, e.g., an optical light microscope after microscopic analysis to, e.g., an electron microscope for correlative studies.

According to some embodiments, a reservoir 608 for coupling fluid (e.g., cryo-fluid) is defined by bellows 610. The annular space 608 between the bellows 610 and cold block 602 can be filled with coupling fluid. In some embodiments, coupling fluid may be replenished, for example, with the addition of a tube entry into the reservoir. In some embodiments, the top of the bellows 610 may stick out above the specimen. When the objective is lowered to achieve contact and/or focus, the bellows can be configured to be compressed by the collar and/or transparent optical element (e.g., a coverslip) but still maintain the coupling fluid reservoir, thus restricting fluid displacement. An outlet port 612 for cooling gas is also shown according to some embodiments.

Figure 7:
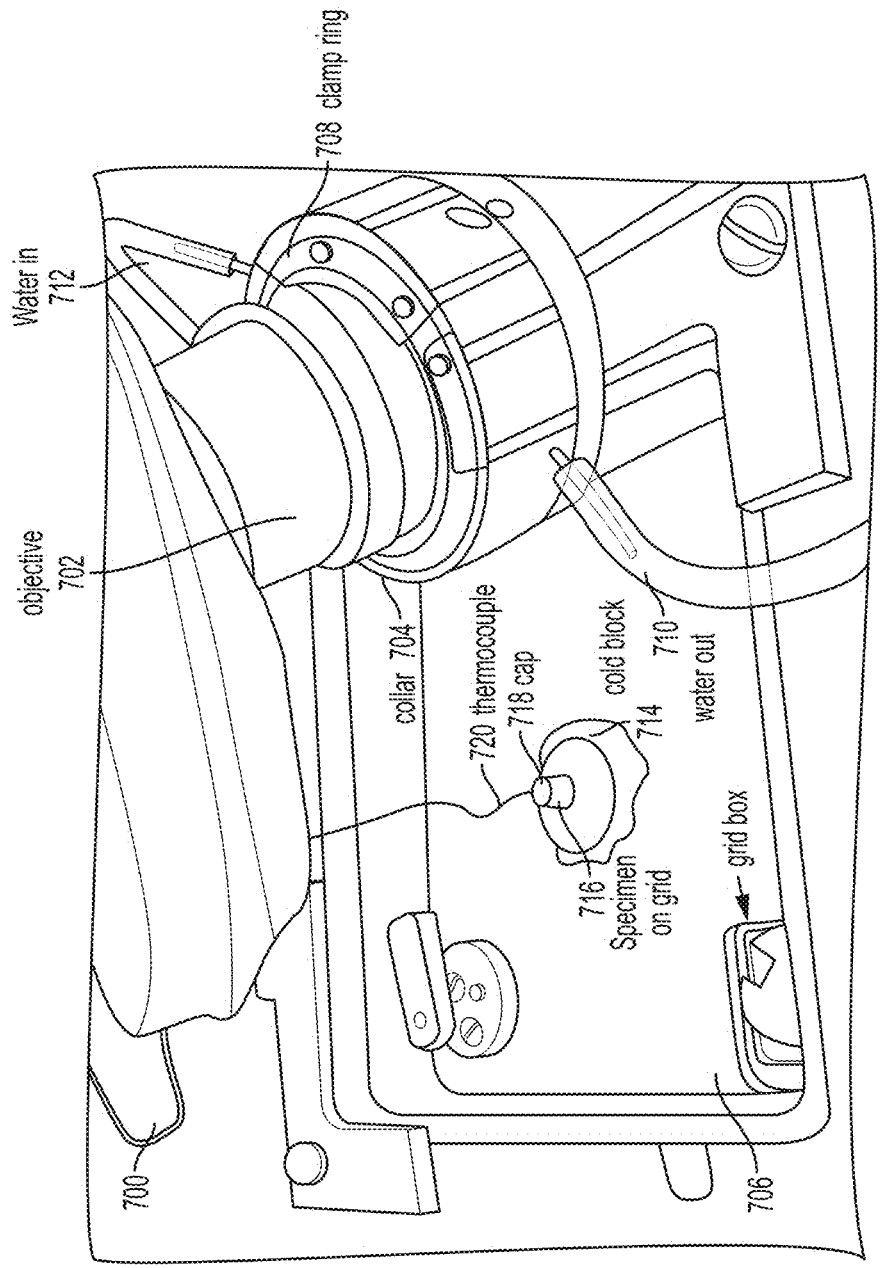
FIG. 7 is a photograph of a cooling assembly for use with an optical microscope according to one or more embodiments.

FIG. 7 is a photograph of a cooling assembly 700 for use with an optical microscope according to one or more embodiments. The objective 702 and collar assembly 704 are shown tilted away from vertical alignment with the sample stage 706. In this example, the collar 704 is attached to the objective by a clamping ring 708. The flowing version fluid is removed and supplied by output port 710 and input port 712 respectively on the collar 704. FIG. 7 also shows a cold block 714 upon which a sample or specimen 716 is placed for viewing. The specimen 716 may be held in place by a cap 718. Temperature can be recorded using a thermocouple 720 positioned beneath the specimen 716 to inform temperature control.

Figure 8:
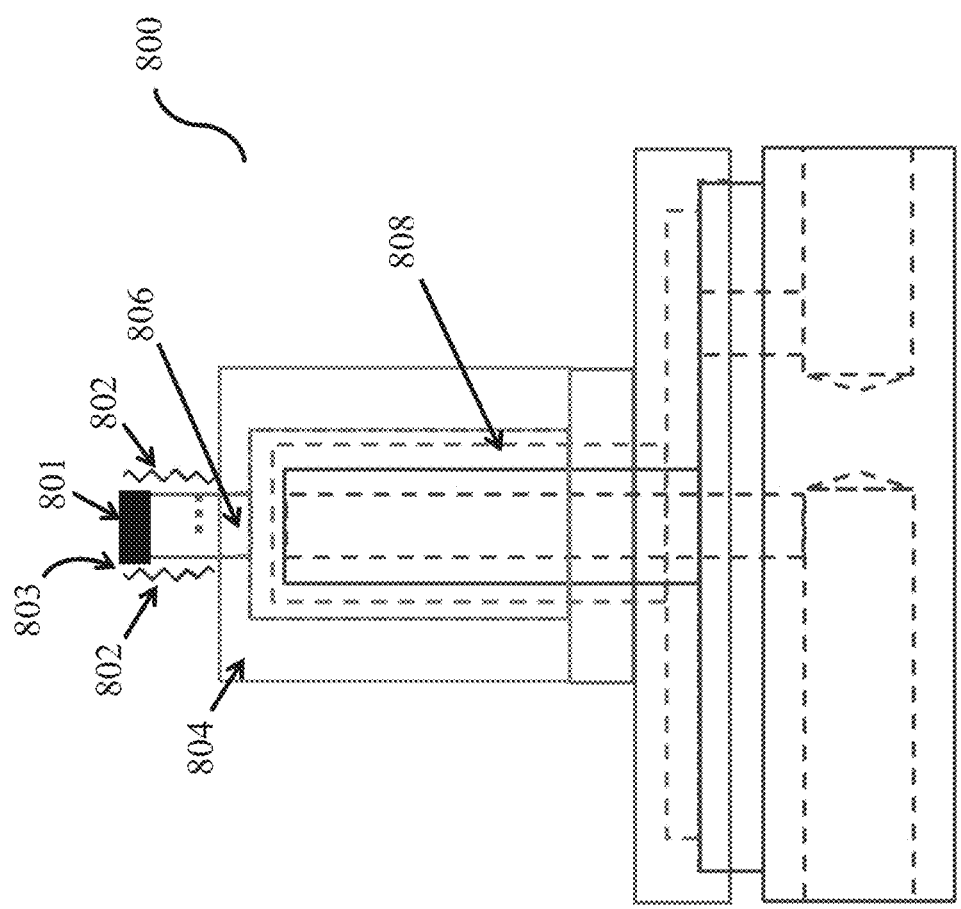
FIG. 8 is a schematic illustration of a part of a cold stage assembly according to one or more embodiments.

FIG. 8 is a schematic illustration of part of a cold stage assembly 800 for use with an optical microscope according to one or more embodiments. The sample 801 is shown surrounded by bellows 802 which form a reservoir 803 for coupling fluid. The bellows 802 are attached directly to the insulating shield 804 (comprising, e.g., Teflon®) that houses the cold block 806 (e.g., a copper block) and encloses the cooling gas plumbing 808 below the sample to allow for uniform distribution of cooling gas.

Figure 9:
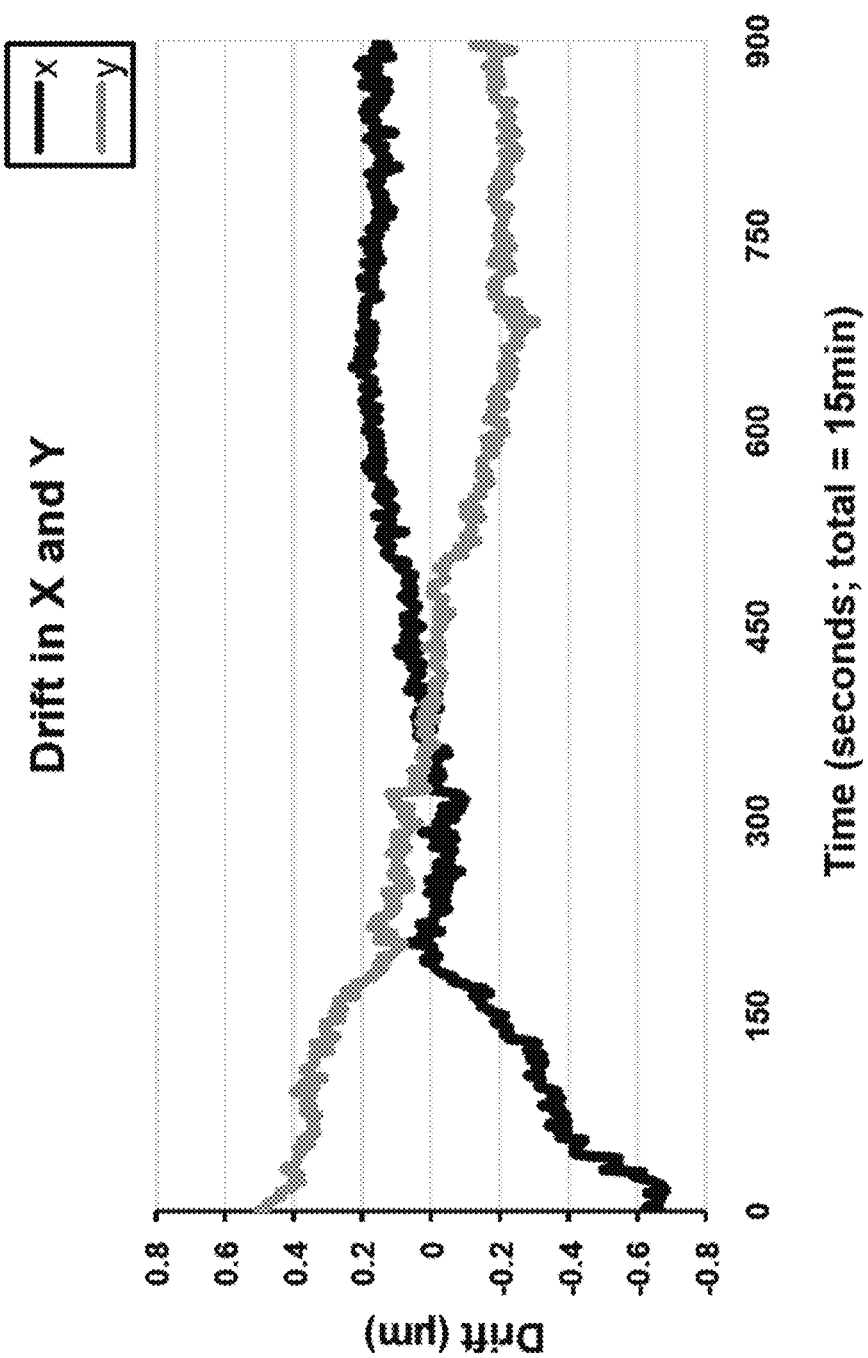
FIG. 9 is a plot of spatial drift (in microns) of the cold stage assembly in x and y directions as a function of time (in minutes) according to one or more embodiments.

FIG. 9 is a plot of spatial drift (in microns) of a cold stage assembly for use an optical microscope in x and y directions as a function of time (in minutes) according to one or more embodiments. A fluorescent suspension of beads was placed on a cold stage and the stage was cooled in accordance with some embodiments. The objective lens and cryo-fluid were positioned for microscopic analysis of the suspension. After about 30 minutes of temperature steady state, a series of several hundred fluorescent photographs of the same area was captured over a period of 15 minutes. The displacement in the x and y directions of each image from the average of all images was determined using a cross-correlation algorithm. The displacement (i.e., drift) of each image relative to the average displacement was plotted in FIG. 9. The range of displacement in the x and y directions was less than 1 micron over the 15 minute time span, a span which is sufficient to collect super-resolution data in the area of the sample in the field of view. Thus, the example plotted in FIG. 9 demonstrates the superior spatial stability achieved with the cooling assembly according to some embodiments.

Figure 10:
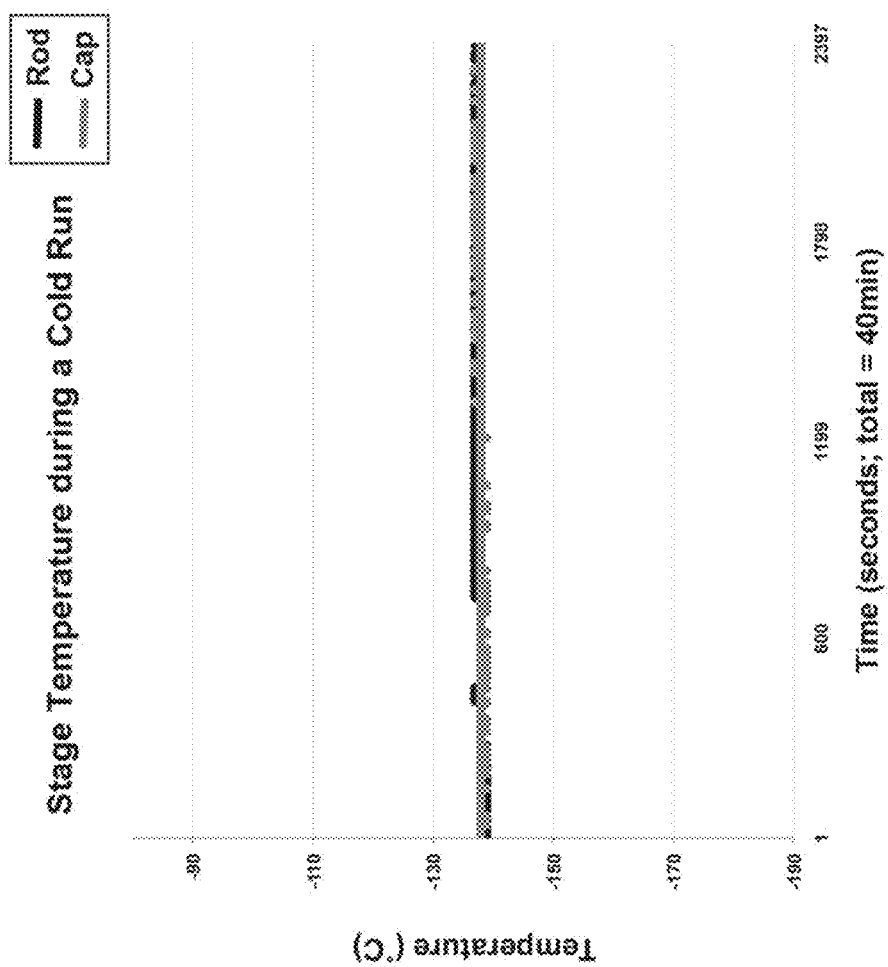
FIG. 10 is a plot of temperature stability (in ° C.) of the sample used in the cooling assembly as a function of time (in seconds) according to one or more embodiments.

FIG. 10 is a plot of temperature stability (° C.) of the sample used in a cooling assembly for use with an optical microscope as a function of time (seconds) according to one or more embodiments. The cold stage was cooled down and allowed to reach steady state over a period of at least 30 minutes. The temperatures of a probe (i.e., a thermocouple) positioned beneath the sample and a probe (i.e., a thermocouple) positioned in a cap covering the sample were then measured over a period of about 60 minutes (i.e., a time span which is sufficient to collect super-resolution data in the area of the sample in the field of view). The accuracy of each probe was one degree. The temperature was stable within +/−1° C. Thus, the example plotted in FIG. 10 demonstrates the superior temperature stability achieved with the cooling assembly according to some embodiments.

Parts of a cooling assembly may be manufactured in different ways to achieve similar spatial and temperature stability while meeting other objectives. For example, a cooling assembly for use with an optical light microscope may have a removable specimen cold carrier for loading, transporting, and/or storing samples. A specimen cold carrier may improve a user's ability to mount a specimen in a cooling assembly. Also, like cartridges, more than one specimen cold carrier (i.e., multiple samples) may be prepared in advance in order to streamline microscopy studies. In some embodiments, a specimen cold carrier is disposable, but in other embodiments, a specimen cold carrier is reusable.

Figure 11:
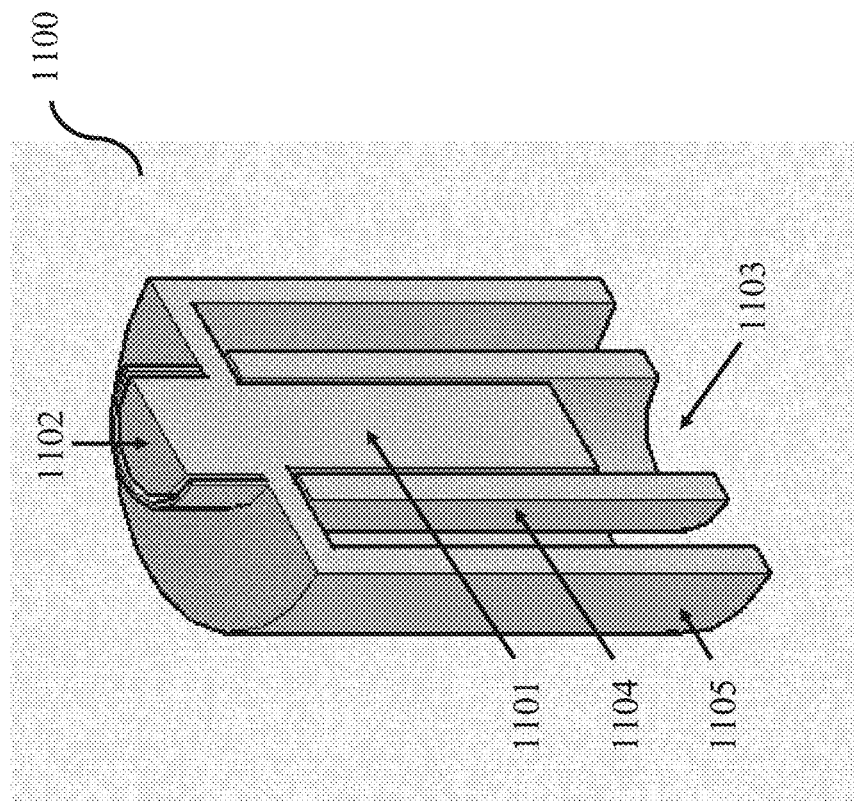
FIG. 11 is a schematic illustration of a specimen cold carrier configured to be used with a cooling assembly according to one or more embodiments.

FIG. 11 is a cutaway view of a removable specimen cold carrier 1100 configured to be used with a cooling assembly according to one or more embodiments. A removable specimen cold carrier 1100 may comprise a cold block 1101 upon which a specimen is placed at, e.g., position 1102. A cold block in a specimen cold carrier may be made of copper but could also be made of any other material having a high thermal conductivity. In some embodiments, all or part of the specimen cold carrier, particularly the cold block, comprises a copper foam. In some embodiments, the bottom surface of the cold block 1101 is cooled with a cooling fluid 1103 to maintain the cold block at a desired temperature. The cold block 1101 and cooling fluid 1103 are shielded from the environment (e.g., ambient air) by one or more layers of surrounding insulation of low thermal conductivity (e.g., a closed-cell foam, a vacuum Dewar, other high resistance enclosure) 1104, 1105.

The cold carrier can be loaded with a specimen to be examined prior to being inserted or plugged into a cooling stage assembly according to one or more embodiments. The specimen may be loaded in the cold carrier remotely, for example, in a cold transfer station, or at the site of a cooling stage assembly. After loading, the cold carrier may be inserted or plugged into a pre-cooled stage, like a cartridge, where it operates as an insulated and elevated cold block, upon which sits the specimen. The temperature (i.e., the coldness) of the cold carrier/block may be maintained by circulating cooling fluid (e.g., nitrogen gas) according to one or more embodiments.

It is to be understood that the disclosed subject matter is not limited in its application to the details of construction and to the arrangements of the components set forth in the description or illustrated in the drawings. It will be appreciated that while a particular sequence of steps has been shown and described for purposes of explanation, the sequence may be varied in certain respects, or the steps may be combined, while still obtaining the desired configuration. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A cooling assembly for a microscope, comprising:
   (a) a first circulation system for an objective lens, comprising:
   a light transparent element; and
   a collar, comprising:
   an upper surface capable of sealing engagement with an objective lens and a lower surface capable of sealing engagement with the light transparent element, wherein the upper surface of the collar and the light transparent element define a region for circulating immersion fluid; and
   one or more ports for immersion fluid transport in and out of the region;
   wherein the first circulating system is configured to maintain flow of the immersion fluid over the light transparent element at a flow rate selected to prevent freezing of the immersion fluid;
   (b) a second circulation system for a sample stage, comprising:
   an insulated enclosure, comprising:
   a cold block for sample placement; and
   one or more ports for transport of a cooling fluid in and out of the insulated enclosure; and
   (c) a cryogenic coupling fluid for optically coupling the light transparent element with a sample.

2. The cooling assembly of claim 1, wherein the cooling fluid comprises at least one of chilled nitrogen gas and liquid nitrogen.

3. The cooling assembly of claim 1, wherein the immersion fluid is at least one of water and an alcohol water mixture.

4. The cooling assembly of claim 1, wherein the immersion fluid flow rate is between about 1 mL/min and 10 mL/min.

5. The cooling assembly of claim 1, wherein the thickness of the light transparent element is between about 0.15 mm and 0.19 mm.

6. The cooling assembly of claim 1, wherein the coupling fluid has a freezing temperature below −135° C.

7. The cooling assembly of claim 1, wherein the coupling fluid is selected from a group consisting of 4-methyl-1-pentene, 1-pentene, 3-methyl-1-pentene, 2-methyl-1-pentene, 1-hexene, and 2-pentene.

8. The cooling assembly of claim 1, further comprising an objective lens.

9. The cooling assembly of claim 8, wherein the distance between the light transparent element and the objective lens is between about 0.1 mm and 1 mm.

10. The cooling assembly of claim 8, wherein the collar further comprises an upper annular ring sized to substantially surround the objective lens, and wherein the upper annular ring is optionally integral to the collar.

11. The cooling assembly of claim 10, wherein the first circulation system further comprises a clamp ring sized to substantially surround the objective lens and joining members that secure the upper annular ring to the clamp ring.

12. The cooling assembly of claim 8, further comprising at least one of a gasket between the upper surface of the collar and the objective lens and a gasket between the lower surface of the collar and the light transparent element.

13. The cooling assembly of claim 1, further comprising a lower annular ring located below the light transparent element, wherein the lower annular ring is secured to the collar.

14. The cooling assembly of claim 1, wherein at least the collar comprises a polysulfone plastic.

15. A cooling assembly for a microscope, comprising:
(a) a first circulation system for an objective lens, comprising:
   a light transparent element; and
   a collar, comprising:
      an upper surface capable of sealing engagement with an objective lens and a lower surface capable of sealing engagement with the light transparent element, wherein the upper surface of the collar and the light transparent element define a region for circulating immersion fluid; and
   one or more ports for immersion fluid transport in and out of the region;
   wherein the first circulating system is configured to maintain flow of the immersion fluid over the light transparent element at a flow rate selected to prevent freezing of the immersion fluid;
(b) a second circulation system for a sample stage configured to receive a specimen cold carrier cartridge and comprising one or more ports for transport of a cooling fluid in and out of the cartridge; and
(c) a cryogenic coupling fluid for optically coupling the light transparent element with a sample.

\* \* \* \* \*